(No Model.) 2 Sheets—Sheet 1.
F. H. RICHARDS.
GEAR CUTTING MACHINE.
No. 305,233. Patented Sept. 16, 1884.
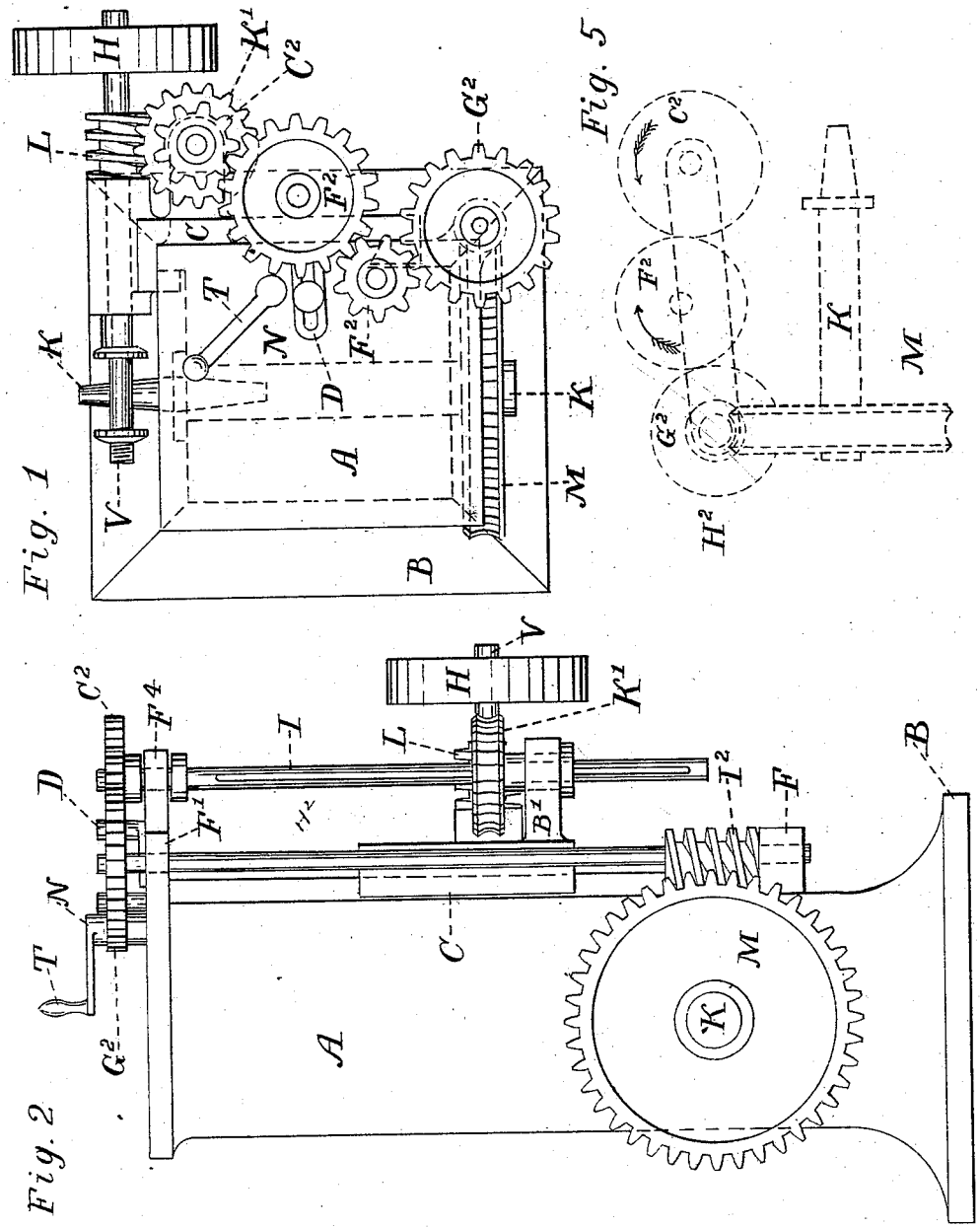
Witnesses:
H. W. Faulkner.
Chas. O. Palmer.
Inventor:
Francis H. Richards.

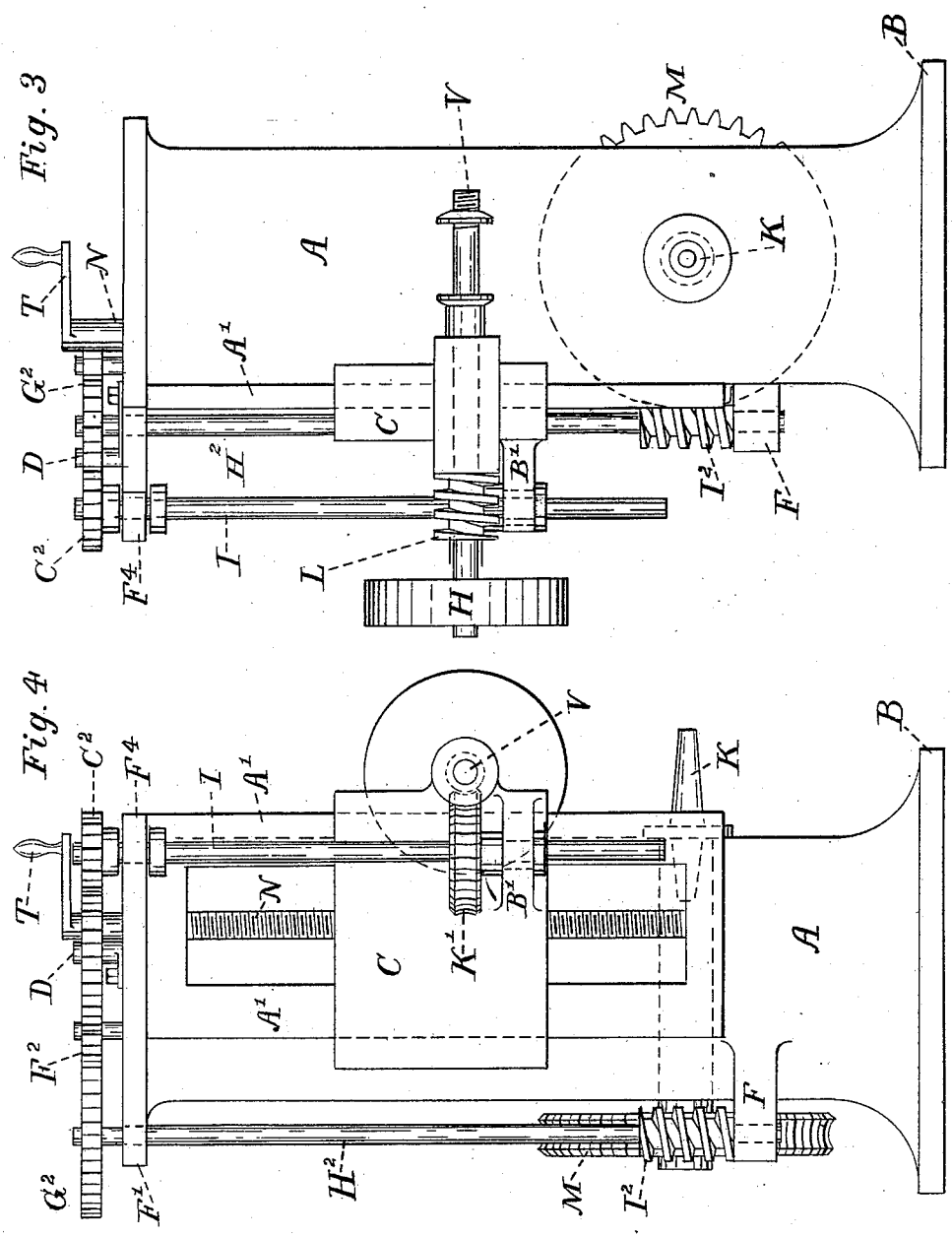

UNITED STATES PATENT OFFICE.

FRANCIS H. RICHARDS, OF SPRINGFIELD, MASSACHUSETTS, ASSIGNOR TO THE PRATT & WHITNEY COMPANY, OF HARTFORD, CONNECTICUT.

GEAR-CUTTING MACHINE.

SPECIFICATION forming part of Letters Patent No. 305,233, dated September 16, 1884.

Application filed December 31, 1883. (No model.)

*To all whom it may concern:*

Be it known that I, FRANCIS H. RICHARDS, a citizen of the United States, residing at Springfield, in the county of Hampden and State of Massachusetts, have invented certain new and useful Improvements in Gear-Cutting Machines, of which the following is a specification, reference being had to the accompanying drawings.

My invention relates to that class of gear-cutting machines in which the blanks are cut by means of a hob or helical cutter and are revolved during the cutting operation harmoniously with that cutter. It has for its object to provide a machine for the purpose described of simple and rigid construction, in which the blank shall be revolved through the agency of the cutter-arbor harmoniously with that arbor. For the attainment of that object it consists in a rigid frame, a blank-arbor having a master-wheel thereon, a cutter-arbor mounted upon a carriage, and an arrangement of gearing, hereinafter described, whereby rotary motion is communicated from the cutter-arbor to the blank-arbor.

Referring to the drawings, Figure 1 is a plan view of a machine embodying my invention. Fig. 2 is a rear elevation. Fig. 3 is a front elevation. Fig. 4 is an elevation of the right-hand side of Fig. 2; and Fig. 5 is a diagram, hereinafter described.

Similar characters of reference refer to similar parts throughout the several views.

The frame A of the machine may be made composite or integral, as shown; but I prefer the latter construction, and to have it so formed as to be adapted to stand in a vertical position. In that case it rests upon suitable legs or supports; or, if of large dimensions, it may preferably be formed with a flanged base, as B. Upon the front of the machine, which is shown in Fig. 3, or upon one of the sides, as in the present instance, are ways A', of any suitable proportions, whereon a carriage, C, carrying the cutter-arbor, is adapted to travel by means of a screw, N, working in a nut (not shown) fixed on that carriage. A crank, T, is provided for turning that screw by hand.

In a suitable fixed bearing a blank-arbor, as K, is adapted to be revolved by means of a master-wheel, as M, fixed thereon, which may be either a bevel or a worm wheel, of which I prefer the latter.

Bearings F F' are provided on the frame for a shaft, $H^2$, preferably parallel to ways A', that carries a pinion, $I^2$, of a construction adapting it to gear with the master-wheel M. Another bearing, $F^4$, is provided opposite F' for supporting the upper end of a shaft, I, and a train of suitable gearing between that shaft and shaft $H^2$, transmits rotary motion from the former to the latter. Of that train of gearing, $C^2$ and $G^2$ are removably fixed to shafts I and $H^2$, respectively, while the one or more intermediate gears, $F^2$, are or may be both removably and adjustably fixed by any suitable means—as, for instance, the slotted stud-holder D. The shaft I below bearing $F^4$ is splined to work in a gear, K', that is carried upon carriage C in a fixed position thereto by means of a bearing, B', on that carriage. The cutter-arbor V is adapted to be revolved in a suitable bearing on carriage C by means of a pulley or equivalent device—as, for instance, a gear or a shaft jointedly connected thereto, and carries a pinion, L, adapted to rotate gear K', and thereby shaft I.

It will be obvious from the drawings and the preceding description that the blank-arbor K is rotated harmoniously with the cutter-arbor V through the agency of the latter arbor, the means whereby that result is accomplished being the gearing, by which term I include also the shafts and their supports carrying that gearing, described, intermediate to those arbors.

In operating my machine the blank is fixed on arbor K and the hob on arbor V. A suitably-constructed train of gears, $C^2$, $F^2$, and $G^2$, are placed in position, and the machine started operating by a belt on pulley H, all in substantially the manner usual in this class of machines. The hob is then fed to the blank by means of screw N until the blank is sufficiently cut, when it is withdrawn and the finished worm-wheel removed.

Heretofore in machines of this class, when the arbor K is driven through the agency of the cutter-arbor, the shaft corresponding to $H^2$ has been placed parallel to arbor V, and that shaft $H^2$ and arbor V connected directly by means of a train of spur-wheels—as, for instance, in the diagram Fig. 5, corresponding in position with Fig. 4. In that diagram the abor V is shown as if supported in an oscillating frame pivotally supported upon shaft $H^2$, which is there horizontal and above the master-wheel M. The driving-gear $C^2$ operates to rotate gear $G^2$ by means of an intermediate gear, $F^2$. Now, suppose the gear $G^2$ to be at rest and the arbor V to be moved downward, as in the operation of cutting a worm-wheel, it is obvious that the said gear $G^2$ becomes a sun-wheel and the gear $F^2$ a planet-wheel, having a rotary motion about its own axis in the direction indicated by the arrow thereon. That rotation of that gear operates to revolve gear $C^2$ in the opposite direction, as indicated by the arrow thereon. Hence it is obvious during the operation of cutting worm-wheels in such a machine there will be a variation in the rotation of the worm $I^2$ and of the hob, whereby the latter will be forced to cut more rapidly upon one side of the teeth thereof than upon the other. That inequality of cutting naturally produces more or less side pressure on the hob and a consequent strain upon and torsion of parts of the machine, especially arbor K, which is highly objectionable, and the more so as the hobs used increase in pitch. By the use of two shafts, as described, of which the one geared to the cutter-arbor is splined and situated parallel to the ways of carriage C, that objectionable feature of the machine is entirely removed, and by the construction of the frame and general arrangement of the parts thereon great rigidity of the whole is secured.

The shaft I, instead of being fixed in gear $C^2$ and adapted to slide in gear K′, may be fixed in the latter and adapted to slide in the former. I prefer that the gear-wheel and pinion K′ and L shall be a worm-wheel and worm-pinion, respectively; but I do not limit myself thereto, but may use bevel-gearing or screw-gearing in place thereof, making in that case, of course, a corresponding modification in the parts supporting and operated by the same.

I do not limit myself to any particular form of carriage C, nor to a single bearing for arbor V, nor to a bearing for that arbor rigidly fixed to that carriage.

I do not claim, broadly, in a machine of this general class combinations having a pair of shafts of which one is splined for the purpose described, as I am aware such have been used; but I am not aware that such shafts have ever been used in the combinations herein described and claimed.

I claim as my invention—

1. In a gear-cutting machine of the class described, in combination, a suitable frame, as A, an arbor, K, a master-wheel, as M, on said arbor, a shaft, $H^2$, carrying a pinion, I, thereon, a carriage, C, carrying a cutter-arbor, that is also the driving-shaft of the machine, a splined shaft, I, parallel to the ways of said carriage, gearing between said cutter arbor and said shaft I, and gearing between shafts I and $H^2$, substantially as and for the purpose described.

2. In a gear-cutting machine of the class described, in combination, a suitable frame, as A, an arbor, K, a master worm-wheel, M, on said arbor, a shaft, $H^2$, carrying a worm-pinion, $I^2$, thereon, a carriage, C, carrying a cutter-arbor, as V, a splined shaft, I, parallel to the ways of said carriage, gearing between said cutter-arbor and said shaft I, and gearing between shafts I and $H^2$, substantially as and for the purpose described.

3. In a gear-cutting machine of the class described, in combination, a suitable frame, as A, an arbor K, a master-wheel, as M, on said arbor, a shaft, $H^2$, carrying a pinion, as $I^2$, thereon, a carriage, C, carrying a cutter-arbor, as V, a splined shaft, I, parallel to the ways of said carriage, worm-gearing between said shaft I and said cutter-arbor, and gearing between shafts I and $H^2$, substantially as and for the purpose described.

FRANCIS H. RICHARDS.

Witnesses:
CHAS. O. PALMER,
F. A. PRATT.